US012447592B2

(12) United States Patent
Anjanappa et al.

(10) Patent No.: US 12,447,592 B2
(45) Date of Patent: Oct. 21, 2025

(54) HYBRID ELECTROMECHANICAL TORQUE WRENCH

(71) Applicant: Creative Systems and Design, LLC, Baltimore, MD (US)

(72) Inventors: Muniswamappa Anjanappa, Baltimore, MD (US); Xia Chen, Baltimore, MD (US); Ben Raab, Baltimore, MD (US); Ashwini Anjanappa, Baltimore, MD (US); Stephen Argo, Baltimore, MD (US); Manu Kemp Anjanappa, Baltimore, MD (US); Praveen Nayak, Baltimore, MD (US); Basavaraju B. N, Baltimore, MD (US)

(73) Assignee: CREATIVE SYSTEMS AND DESIGN, LLC, Baltimore, MD (US)

( * ) Notice: Subject to any disclaimer, the term of this patent is extended or adjusted under 35 U.S.C. 154(b) by 375 days.

(21) Appl. No.: 18/304,972

(22) Filed: Apr. 21, 2023

(65) Prior Publication Data

US 2023/0364755 A1 Nov. 16, 2023

Related U.S. Application Data

(60) Provisional application No. 63/333,193, filed on Apr. 21, 2022.

(51) Int. Cl.
*B25B 23/142* (2006.01)

(52) U.S. Cl.
CPC ...... *B25B 23/1425* (2013.01); *B25B 23/1427* (2013.01)

(58) Field of Classification Search
CPC ... B25B 23/14; B25B 23/142; B25B 23/1422; B25B 23/1425; B25B 23/1427
See application file for complete search history.

(56) References Cited

U.S. PATENT DOCUMENTS

| | | | |
|---|---|---|---|
| 2,300,652 | A | 11/1942 | Cooney |
| 2008/0134800 | A1 | 6/2008 | Escoe et al. |
| 2009/0260491 | A1 | 10/2009 | Rainone et al. |

(Continued)

FOREIGN PATENT DOCUMENTS

| | | | | | |
|---|---|---|---|---|---|
| DE | 102014106269 | A1 | * | 11/2014 | ......... B25B 23/1427 |
| DE | 20 2017 101 525 | | | 5/2017 | |
| JP | 2014226776 | A | * | 12/2014 | ......... B25B 23/1427 |

OTHER PUBLICATIONS

International Search Report Issued in co-pending application No. PCT/US2023/063172, dated Aug. 22, 2023.

(Continued)

*Primary Examiner* — David B. Thomas
(74) *Attorney, Agent, or Firm* — Whiteford, Taylor & Preston, LLP; Peter J. Davis

(57) ABSTRACT

A torque wrench having post-torque rotation setting and measurement function, optionally including auto transition from torque to angle rotation, which may operation with and without batteries, including low profile design, improved visual, audio and haptic feedback, a recesses pawl seat for improved accuracy and longevity and improved handle rotation for torque setting and spring unwinding by virtue of improved torque setting nut design.

1 Claim, 15 Drawing Sheets

(56) References Cited

U.S. PATENT DOCUMENTS

| | | | | |
|---|---|---|---|---|
| 2010/0256929 | A1* | 10/2010 | Gharib | B25B 23/1425 702/41 |
| 2011/0132157 | A1 | 6/2011 | Duvan et al. | |
| 2012/0132043 | A1 | 5/2012 | Chen et al. | |
| 2014/0326113 | A1 | 11/2014 | Anjanappa et al. | |
| 2016/0031069 | A1 | 2/2016 | Nino et al. | |
| 2016/0031070 | A1 | 2/2016 | Ball | |
| 2021/0308844 | A1 | 10/2021 | Adams | |

OTHER PUBLICATIONS

International Search Report Issued in co-pending application No. PCT/US2023/066061, dated Aug. 29, 2023.

* cited by examiner

HYBRID ELECTROMECHANICAL TORQUE WRENCH

FIELD OF THE INVENTION

The present invention relates to hand tools and in particular to torque wrenches.

DESCRIPTION OF THE BACKGROUND

Often, fasteners used to assemble performance critical components are tightened to a specified torque level to introduce a "pretension" in the fastener. For example, high tensile-strength steel bolts used to fasten components of military vehicles, aerospace vehicles, heavy machinery, and equipment for petrochemical operations frequently have required torque specifications. As torque is applied to the head of the fastener, eventually, beyond a certain level of applied torque the fastener actually begins to stretch. This stretching results in pretension in the fastener which then holds the joint together. Overstressing fasteners can lead to their breakage whereas under-stressing bolts can lead to joint failure, leakage, etc. Furthermore, in situations where gaskets are being utilized between the components being joined, an unequally stressed set of fasteners can result in gasket distortion and subsequent problems like leakage. Accurate and reliable torque wrenches help insure that fasteners are tightened to the proper specifications.

Torque wrenches vary from simple mechanical types to sophisticated electronic types. There are several types of mechanical torque wrenches that are routinely used to tighten fasteners to specified torque levels. Of these, clicker type mechanical torque wrenches are very popular. Clicker type mechanical torque wrenches make an audible click to let the user know when a preset torque level has been achieved and simultaneously provide a feeling of sudden torque release to the user. One example of a clicker type torque wrench includes a hollow tube in which a spring and pawl mechanism is housed. The pawl is forced against one end of a bar that extends from a drive head. The bar and drive head are pinned to the hollow tube about a pivot joint and rotate relative thereto once the preset torque level is exceeded. The preset torque level is selected by a user by causing the spring to exert either greater or lesser force on the pawl. The force acts on the bar through the pawl to resist rotation of the bar relative to the hollow tube. As the torque exerted on the fastener exceeds the preset torque value, the force tending to cause the bar to pivot relative to the hollow tube exceeds the force preventing its rotation and the pawl "trips." When released by the action of the pawl, the bar pivots and hits the inside of the tube, thereby producing a click sound and a sudden torque release that is detectable by the user. Typically, the preset torque values to assist the user in setting the torque wrench are permanently marked on a drum type scale that is visible through a window near or on the handle, or marked on the tube itself. For most clicker type torque wrenches, the preset torque is set by rotating either an adjuster sleeve on the handle, an end cap, or a thumb screw.

Another example of a clicker type torque wrench (a so-called "split-beam" torque wrench) measures the deflection of a deflectable beam relative to a non-deflectable beam, the deflectable beam causing a click once the preset torque is reached. These and other types of clicker type mechanical torque wrenches are popular since they are relatively easy to operate and make torquing relatively quick and simple. The user merely sets the preset torque value and pulls on the handle until he/she hears and feels the click and torque release indicating to the user to cease torquing the fastener.

Several drawbacks limit the usage of clicker type torque wrenches. Often, these torque wrenches have permanently marked gages that are read by the user when setting the preset torque value. These gages can be hard to read, especially when the user is occupied with torquing a fastener with smooth and continuous motion to achieve proper fastening. Some existing torque wrenches address this issue by incorporating a magnifying glass or using a separate high resolution secondary scale. Still, the size of the markings is often small and the resolution of the markings is often limited by the physical space available on the gage. As well, the lack of high resolution may prevent the user from being able to preset to a desired torque value that includes a fraction of the desired units. Furthermore, these torque wrenches are often used in hard to reach, poorly lit areas, such as under the hood of an automobile, making readings potentially even more difficult.

As well, since the drum or other type of permanently marked gage can be fairly small, the upper torquing range of clicker type torque wrenches can be limited to less than the capability of the other mechanical parts of the wrench. Furthermore, in most prior art clicker type torque wrenches, the gages are marked with only one or two sets of units (i.e. foot-pounds and Newton-meters). The user is therefore limited to these two units and anything else is normally calculated manually.

Recalibration of existing clicker type torque wrenches, especially spring type clickers, often requires disassembling the unit to replace worn out parts, which can be expensive and time consuming. Recalibration is often needed to correct the effect of the spring's characteristics and mechanical wear that occurs over time. Often, such wear cannot be compensated for without recalibration since the gages are most often permanently printed on the handle.

While mechanical torque wrenches having electronic sensors and displays have been introduced to address the disadvantages of permanent marked gauges on the body of the device, such devices suffer the disadvantage of not being operable without batteries.

Additionally, it is now becoming common that an assembly specification requires the application of a specified torque followed by a further rotation of the fastener according to a specified angle of rotation. Current clicker torque technologies require different tools, a first tool to apply the torque and a second tool to apply additional rotation to the specified angle.

The present invention recognizes and addresses the foregoing considerations, and others, of prior art constructions.

SUMMARY OF THE INVENTION

An new improved hybrid torque wrench (hereinafter referred to as "Click-to-Angle") is therefore provided having one or more of the following features to combine torque application and angle application in a single unit:

a. post-torque angle-of-rotation setting and measurement function
b. automatic transition from torque to angle-of-rotation
c. operation with and without batteries;
d. addition of printed circuit board ("PCB") spacer between spring and torque setting screw to provide ideal location for mounting accurate displacement sensor;
e. low profile design (to improve usability in tight spaces);

f. a recessed pawl seat for improved accuracy and longevity, and g. improved handle rotation for torque setting and spring unwinding by virtue of improved torque setting nut design;

h. enhanced "click" feedback with visual, audio and haptic alerts;

i. a rated torque-limiting spacer to prevent the torque wrench from being applied beyond its rated load.

Each of these embodiments may be used independently or in combination with one or more of the other embodiments. Every combination and sub-combination of the above-listed embodiments is considered to be within the scope of the inventions described herein According to a first basic embodiment of the present invention there is provided a mechanical torque wrench for engaging a workpiece, the torque wrench including a main tube defining an elongated interior compartment and a wrench head including a workpiece engaging portion and a bar extending therefrom. The wrench head is pivotally secured to a first end of the main tube at a pivot joint. The bar extends into the interior compartment and the workpiece engaging portion extends outwardly from the main tube. A hand grip is located on a second end of the main tube and a set spring is disposed within the interior compartment of the main tube. A tilting pawl is disposed between a rear face of the bar and the set spring. A torque setting screw is threadably received within the interior compartment of the main tube such that the torque setting screw moves along a longitudinal axis of the main tube when rotated. Rotation of the torque setting screw in a first direction compresses the set spring and rotation in a second direction allows expansion of the set spring. A lock ring is positioned adjacent the hand grip and is operatively connected to the torque setting screw and rotatable relative to the main tube. A resistive element is operatively coupled to the torque setting screw and produces an output signal, the output signal being dependent on the position of the torque setting screw relative to the resistive element. An electronic controller converts the output signal into an equivalent torque value that indicates a preset torque to be applied by the mechanical torque wrench to the workpiece. A user interface includes a display for displaying the equivalent torque value. When application of the preset torque is reached, the electronic controller first detects the mechanical "click" event and secondly sends an activation signal to audio, visual and/or haptic devices to notify the user that the preset torque has been reached.

According to a second basic embodiment (split beam torque wrench), there is provided a mechanical torque wrench for engaging a workpiece including a head that couples to a socket to rotate a workpiece. A housing extends from the head to form a handle. Within the housing forming the handle are two beams: a lever beam that transmits the force from the handle to the head and a deflecting beam that couples to the head and not the handle. The deflecting beam deflects away from the lever beam to indicate that a predetermined torque has been applied. A torque adjustment assembly moves the lever beam relative to the head to set the predetermined torque, and a pin follows the linear display to indicate to the user the set predetermined torque.

According to a first enhanced embodiment, the first or second basic embodiment described above may include an inertia sensing device, for example a gyro or an accelerometer, coupled to a microcontroller. The inertia sensing device transmits inertial data to the microcontroller which determines angle of rotation of the tool and transmits it to the display for displaying angle of rotation. According to preferred embodiments, a user may set a desired angle of rotation in an input device coupled to the microcontroller, and the microcontroller may output a "set angle of rotation achieved" signal to an audio, display and/or haptic device when the wrench has been rotated to the preset angle of rotation.

While the term microcontroller is used throughout this disclosure to refer to a device with processing functionality, it should be understood that any device that can perform the functions of a microcontroller may be substituted for the microcontroller(s) described herein without departing from the scope or intent of the invention.

According to another embodiment, the first enhanced embodiment may further include a second enhanced embodiment characterized by an automatic transition from application of torque to post-torque angle of rotation. According to this embodiment, the microcontroller may be configured to receive input instructions from the user via the input device for both desired application of torque and post-torque angle of rotation. Once the desired values are set, the user will commence application of torque and once the preset torque value has been reached, the device will detect when the preset torque has been achieved using an inertial sensor, gyro or accelerometer, may or may not make an visual, sound or haptic notification of "preset torque achieved," and allow the user to continue rotation of the tool without pausing until the preset post-torque angle of rotation has been reached, at which time the microcontroller will cause the audio, display or haptic device to signal the user.

According to another embodiment, the first basic embodiment, the first enhanced embodiment and/or the second enhanced embodiment may further include a third enhanced embodiment in which physical torque indicators (such as scale) are printed, stamped, etched, embossed, engraved, painted or otherwise placed on the main tube/housing and on handle in order to permit use of the application of desired torque in the absence of batteries.

According to another embodiment, the first basic embodiment, the first enhanced embodiment, the second enhanced embodiment, and/or the third enhanced embodiment may further include a fourth enhanced embodiment characterized by a low profile design in which a PCB spacer element (e.g., a tube, bar, or rod) is placed between the torque setting screw and the set spring. The PCB spacer element has a narrower diameter than the main tube, and the resistive element interfaces directly with the spacer element rather than with the torque setting screw. With this method both the tracer of the resistive element and the PCB spacer are translating and therefore the sensing accuracy is improved and wear and tear are minimized. As the torque setting screw is rotated, the PCB spacer is forced forward and backward driving the resistive element with it. With the resistive element recessed into the body of the tool by virtue of the narrow profile spacer element, the printed circuit board and display can likewise be lowered toward the longitudinal axis of the device, providing an overall smaller profile.

According to another embodiment, the first basic embodiment, the second basic embodiment, the first enhanced embodiment, the second enhanced embodiment, the third enhanced embodiment and/or the fourth enhanced embodiment may include a fifth enhanced embodiment providing increased sound, visual and/or haptic feedback to the user when preset torque and/or preset angle of rotation has been achieved. According to this feature, an inertial sensor, for example a gyro or an accelerometer, and microcontroller may be configured to detect the physical "click" that occurs when a clicker-type torque wrench reaches the preset torque, and cause an audio, visual display or haptic device to signal the user that the preset torque has been achieved. Similarly, the inertial sensor and microcontroller may similarly cause an audio, visual display or haptic device to signal the user when the preset angle of rotation has been reached.

According to yet another embodiment, the first basic embodiment, the first enhanced embodiment, the second enhanced embodiment, the third enhanced embodiment, the fourth enhanced embodiment, and/or the fifth enhanced embodiment may include a sixth enhanced embodiment in which the pawl seat at the end of the hinge is recessed into the end of the hinge with a profile that is narrower than the end of the hinge. According to this feature, each time the set torque is achieved, only the end of the hinge contacts the inside surface of the main tube, producing less wear on the pawl seat, preserving device accuracy and increasing device longevity.

According to yet another embodiment, the first basic embodiment, the first enhanced embodiment, the second enhanced embodiment, the third enhanced embodiment, the fourth enhanced embodiment, the fifth enhanced embodiment and/or the sixth enhanced embodiment may include a seventh enhanced embodiment in which the nut (herein referred to as torque setting nut) in the main tube which receives the torque setting screw is situated at an end of the main tube and has a shoulder portion that extends longitudinally past the end of the main tube and extends radially beyond the outside surface of the main tube to contact the inside surface of the scale/handle tube. According to this embodiment, there are only two points of contact between the main tube and the scale tube, and rotation of the scale tube relative to the main tube is rendered less difficult for the user.

According to yet another embodiment, which may be used with any one or more of the above-described embodiments, a toque limiting spacer is provided in a narrowed section of the main tube, the length of which is arranged so that when the rated torque of the tool is reached, the end of the spacer contacts the main tube and any additional rotation beyond the rated torque is transmitted through the spacer.

According to yet another embodiment, which may be used with any one or more of the above-described embodiments, an enhanced visual display is provided with one or more of the following: vivid colors, real-time dynamically scaled font sizes to minimize human error, and real-time changing background colors to indicate critical steps during application of torque and angle.

It is contemplated and should be understood by all others that any one of these improvements may be used individually and/or in any combination with any one or more of the other improvements in any combination and sub-combination. Stated another way, each of these improvements is considered to be an invention, and every combination of one or more of these improvements is likewise considered to be an invention.

BRIEF DESCRIPTION OF THE DRAWINGS

The foregoing summary, as well as the following detailed description of the preferred invention, will be better understood when read in conjunction with the appended drawings. For the purpose of illustrating the invention, there are shown in the drawings various embodiments which are presently preferred. It should be understood, however, that the invention is not limited to the precise arrangements and instrumentalities shown. In the drawings.

Figure 1A:
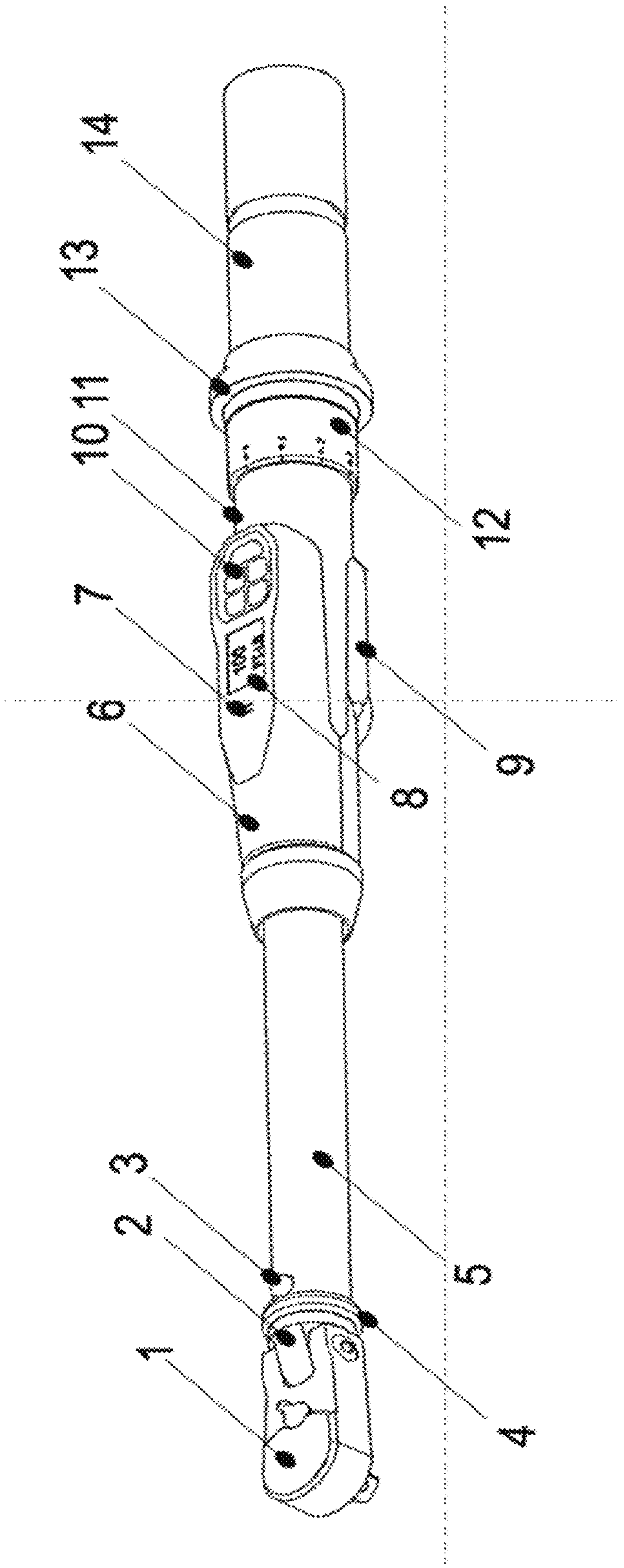
FIG. 1A is a cutaway perspective view of an electromechanical Click-to-Angle according to an embodiment of the invention.

Features in the attached drawings are numbered with the following reference numerals:

| | |
|---|---|
| 1-Flex Head | 14-Handle |
| 2-Hinge | 14-Knurled Handle press fit over Scale Tube |
| 3-Hinge Pin | 15-Ratchet Gear Pawl Reversing Lever |
| 4-Rubber Seal | 16-Tilting Pawl |
| 5-Main Tube | 17-Pawl Seat |
| 6-Plastic Housing Assembly | 18-Cam |
| 7-Buzzer | 19-Torque Spring |
| 8-Color TFT Display | 20-PCB Spacer |
| 9-Battery Compartment | 21-Electronic Controller PCB |
| 10-Input Keys | 22-Torque Setting Screw |
| 11-Mechanical Linear Scale | 23-Torque Setting Nut with shoulder |
| 12-Rotary Scale | 24-Scale Tube |
| 13-Lock Collar | 25-Displacement Sensor Tracer |
| 26-Acceleration Sensor | 109-Split Beam TGT Display with Dynamic Color |
| 27-LED | 110-Split Beam Unit Key |
| 28-Vibration motor | 111-Split Beam Main Beam |
| 101-Split Beam Flex Head | 112-Split Beam Mode Key |
| 102-Split Beam Torque Tube | 113-Split Beam Scroll Up Key |
| 103-Split Beam Torque Indicator | 114-Split Beam Scroll Down Key |
| 104-Split Beam Torque Scale | 115-Split Beam Power Button |
| 105-Split Beam Handle | 116-Split Beam Anchor Beam |
| 106-Split Beam Rotary Torque Setting Knob | 117-Split Beam Catch |
| 107-Split Beam Knob Enclosure | 118-Potentiometer |
| 108-Split Beam Electronic Controller Housing | 201 Rated Torque Limiting Spacer |
| | 203 Strain Gauge |
| | 205 Spacer Gap |

DETAILED DESCRIPTION OF THE INVENTION

The invention described herein presents for the first time a single tool that provides both a mechanical torque wrench or "clicker" function and the ability to set a desired post-torque angle of rotation and notify the user when the set post-torque angle of rotation has been achieved. Furthermore, this invention enhances the haptic (click) feedback by detecting the click electronically and generating additional visual and audio signals. This invention consolidates two tools into one, improving efficiency and productivity. The inventors have coined the term "Click-to-Angle" for this hybrid electromechanical torque wrench with post-torque set-angle rotation.

According to various embodiments of the Click-to-Angle invention, an electronic controller is integrated into a typical mechanical torque wrench or "clicker" to result in a hybrid device that can also be used to set a desired post-torque angle of rotation and notify the user when the set post-torque angle of rotation has been achieved. In addition to standard mechanical torque wrench functions, the Click-to-Angle tool of the invention may include:

- a novel angle measurement function;
- high-visibility digital display of set torque and angle (in monochrome and/or multiple color);
- visual feedback showing real-time angle during rotation;
- haptic feedback to signal when the specified angle is reached;
- audible sounds to signal when the specified angle is reached;
- storage for multiple angle measurements;
- communication to external devices, and
- enhance the traditional haptic feedback due to "clicking" by additionally generating visual and audio feedback when click occurs (this feature improves usage of the device in especially noisy environments);
- rated torque limiting spacer;

as well as other supporting functions.

Figure 1B:
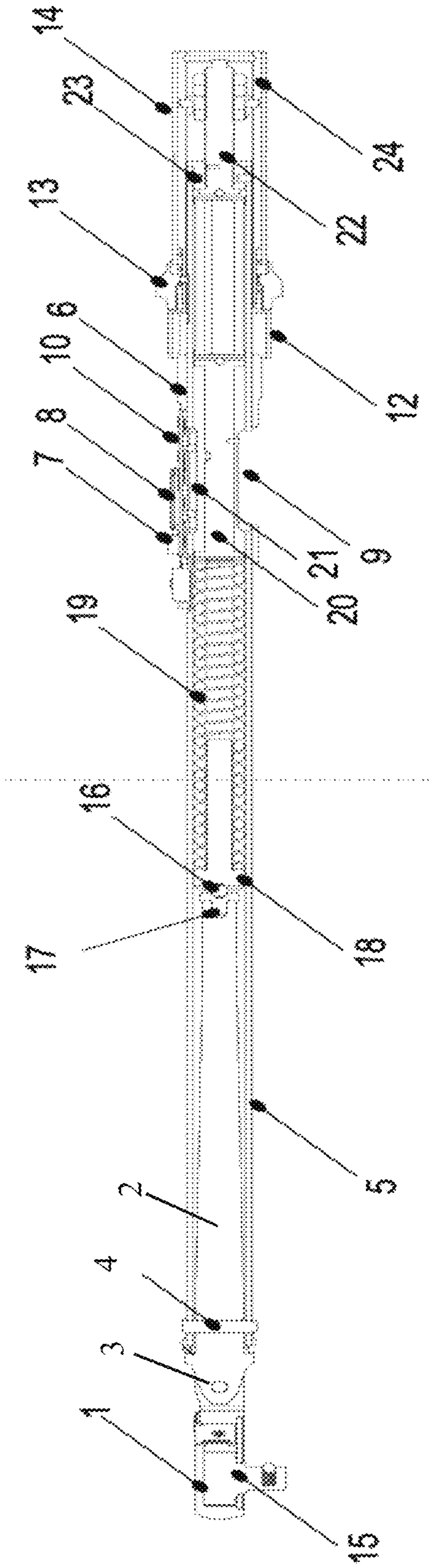
FIG. 1B is a cutaway view of the electromechanical Click-to-Angle of FIG. 1A.
Figure 1C:
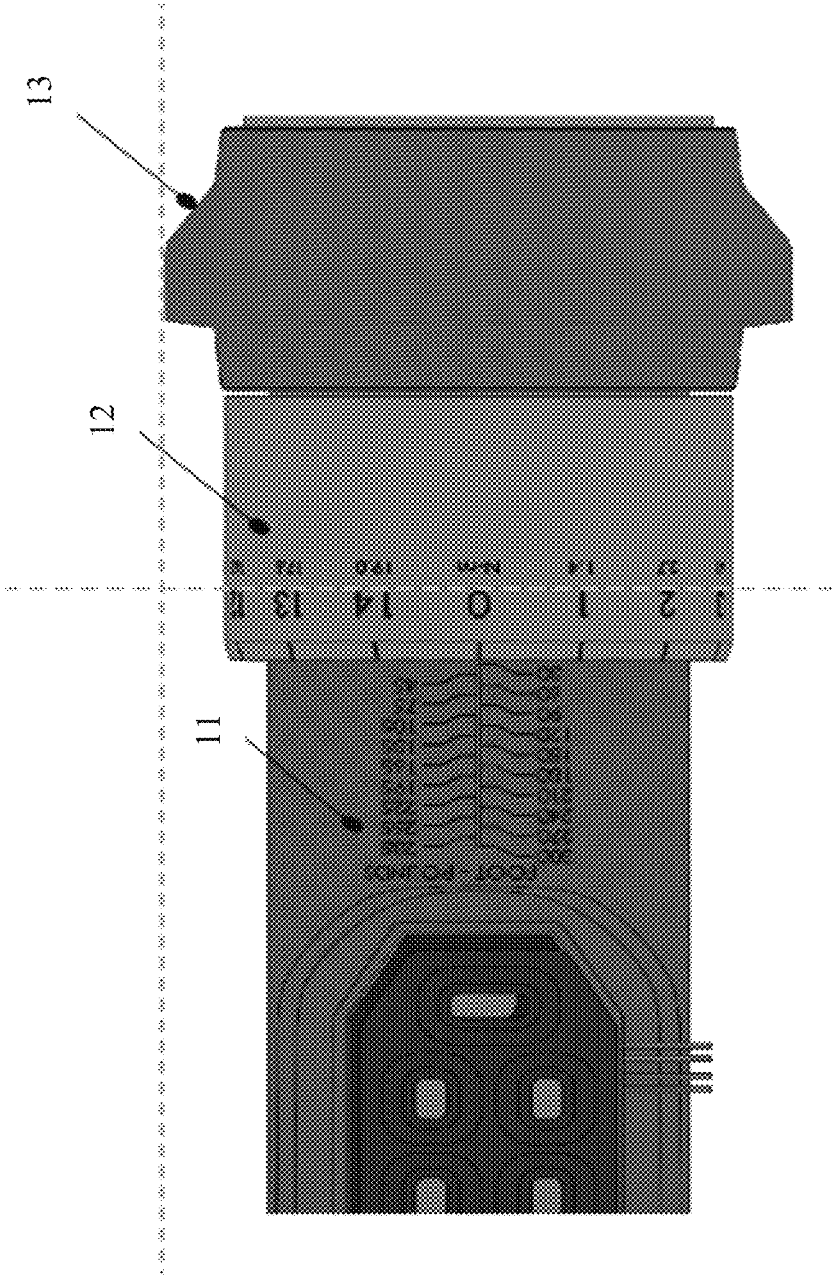
FIG. 1C is an exploded view of an electromechanical Click-to-Angle according to an embodiment of the invention.

FIG. 1A shows a Perspective view of one preferred embodiment of the new Hybrid Electromechanical Torque Wrench. Flex Head is a sub assembly of high strength steel sub-assembly consisting of drive gear, pawl, Reversing Lever, etc. Similarly Plastic Housing Assembly consists of two or more plastic parts that accommodates electronic Control PCB, Batteries, haptic actuator in the form of an unbalanced mass motor, and fasteners. FIG. 1B shows the cross-sectional view showing how all the parts are arranged inside the Main Tube and Plastic Housing. FIG. 1C shows a closeup view of printed/stamped/etc. analog linear scale and rotary scale.

Figure 2:
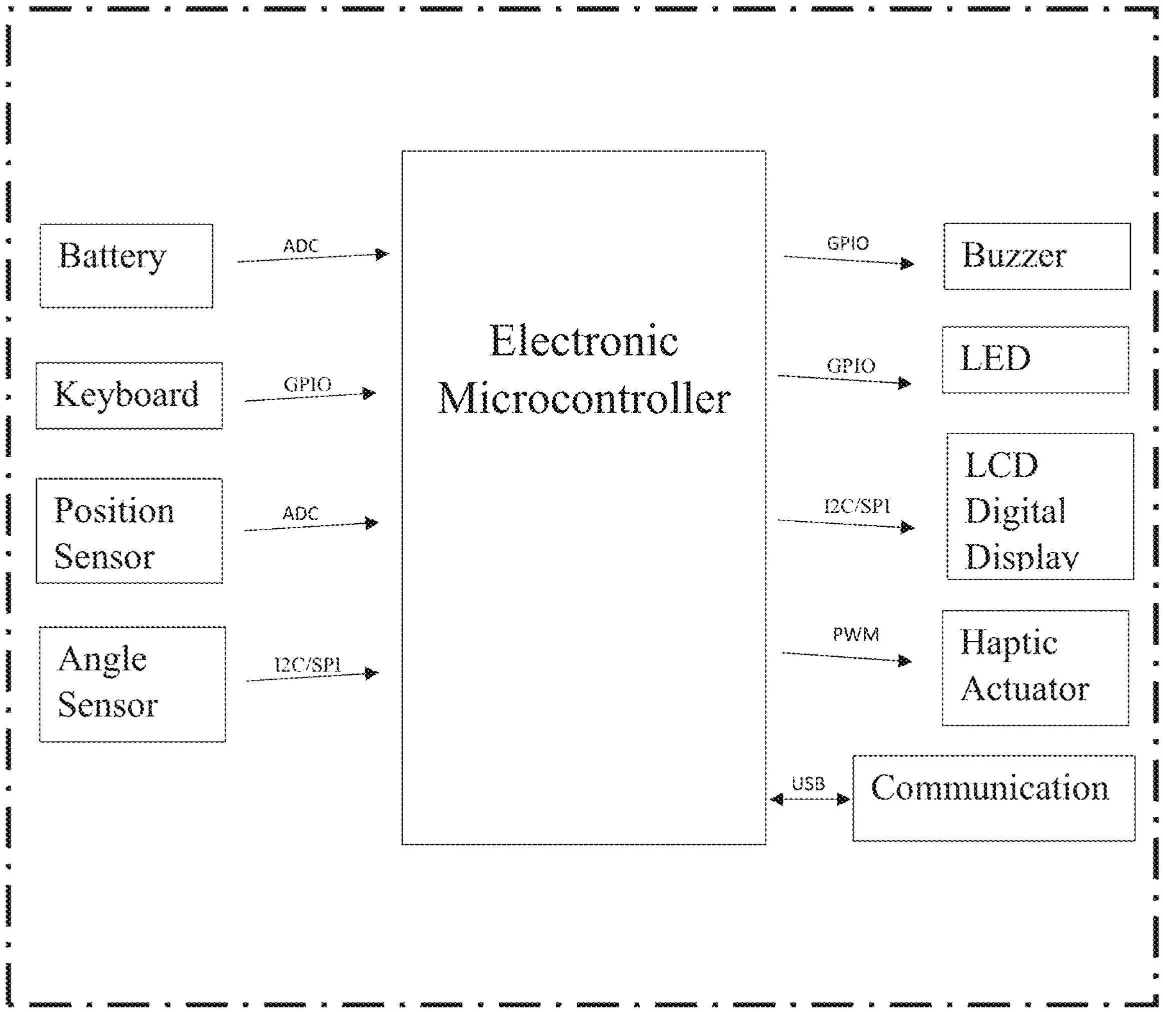
FIG. 2 is a block diagram representation of an electronic controller for an electromechanical Click-to-Angle according to an embodiment of the invention.

FIG. 2 is a block diagram representation of the electronic controller of an Click-to-Angle according to an embodiment of the invention. As the user turns the torque setting screw to set desired torque, the position sensor mounted on the translating PCB spacer generates an electrical signal which is then converted to a digital signal by the microcontroller. The microcontroller collects this information and displays it on the LCD via I2C/SPI communication. Alternatively, the user can select the desired torque unit (N·m, ft-lb, in-lb, kg·cm, etc) using the keyboard. The battery level is also monitored so the user is notified when it is low. Once desired torque is set, the operator can set the target angle on the LCD panel through key input. The user can now apply torque by rotating the Click-to-Angle Torque Wrench. When the desired torque is reached, in addition to the traditional mechanical "click" sound and a sudden release of resisting torque, this Click-to-Angle will enhance the occurrence of "click" by notifying the user by LEDs, audible devices, and/or haptic actuator. The user may then continue rotation of the Click-to-Angle toward the desired post-torque angle of rotation. The angle sensor, for example a MEMS gyro IC chip, will read the gyro rate and acceleration rate in x, y, and z directions, as well as the temperature data (accurate angle calculation requires the temperature at which the gyro is operating), which is then displayed on the LCD. When the preset angle is reached, the operator is notified by LEDs, audible devices, and/or haptic actuator. Additionally, the electronic controller can communicate with external devices via USB port, which facilitates data uploads and downloads.

Additionally the angle sensor/on-board MEMS gyro IC may record and save the accelerometer output in X, Y, and Z directions. This can be used to detect if the unit has been dropped or not. From the service point of view, this information is very valuable.

According to preferred embodiments of the invention, a color TFT LCD may be used as a display device to provides not only high contrast display, but also enable functions such as (i) significantly improved sunlight readability, (ii) color coded easy to grasp information, (iii) user specific customizable icon display, (iv) programmable LED icons in variety of colors eliminating the need for specialized LED hardware, (v) off-site product updates with new icons, (vi) display of progression bars instead of additional LEDs on the PCB, (vi) ability to display any characters/icons, etc.

Figure 3:
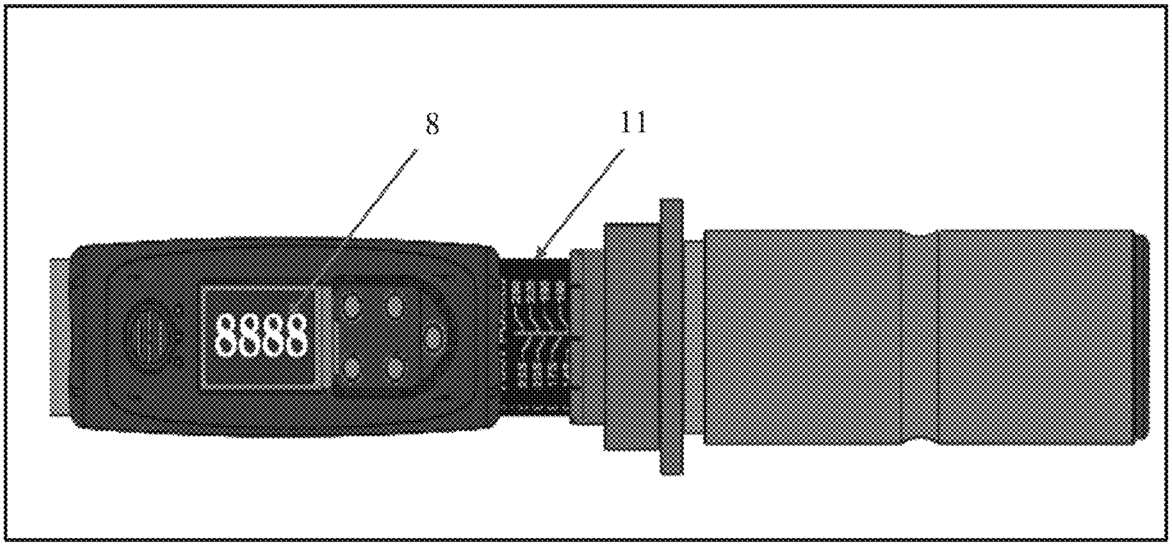
FIG. 3 is a representation of a dual Digital Display 8 and mechanical scale 11 according to an embodiment of the invention.

According to another embodiment of the invention, the Angle-Clicker may be functional with or without batteries by providing both a digital display and an analog scale printed on the body of the instrument as shown in FIGS. 1C and 3. With this invention, the user may use the easy-to-read digital display under normal circumstances, but if the batteries run out, the Click-to-Angle is still fully functional through use of the analog scale. Unlike other mechanical torque wrenches with digital display that are limited by battery life, the present invention is functional with or without batteries, essentially providing continuous usage.

Figure 4:
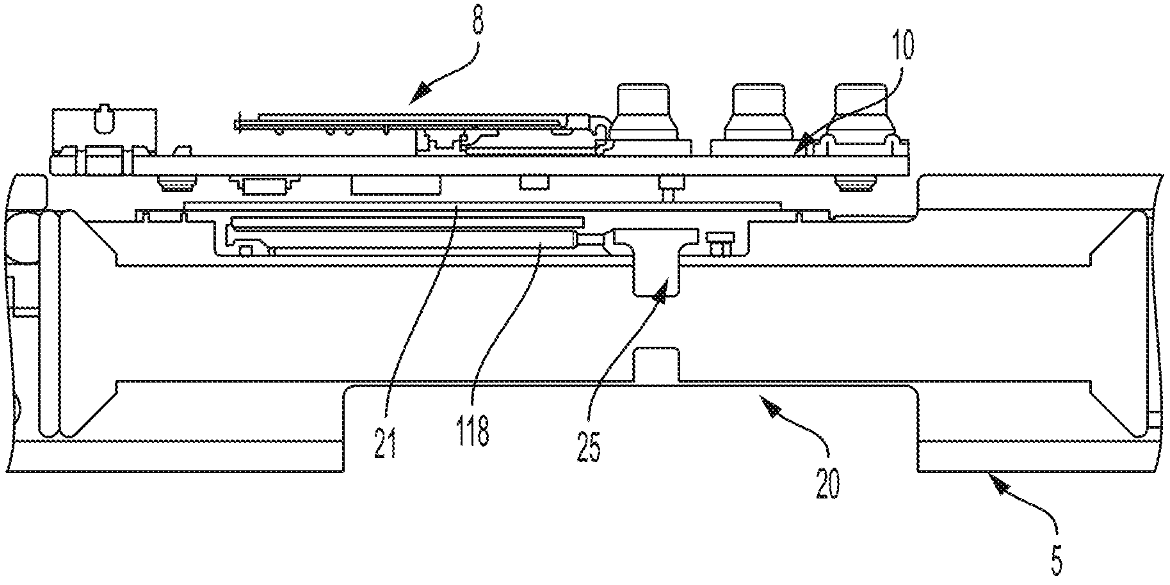
FIG. 4 is a close-up cross sectional view of a low profile embodiment of the invention including PCB spacer and PCBA. This close up cross-sectional view shows PCB Spacer 20, main tube 5, high viz dynamic color TFT display 8, operating keys 10, and tracer/nub of displacement sensor 25. The tracer 25 rests in an annular groove of spacer 20 and translates as the torque setting screw 22 is rotated to set target torque.

According to another embodiment of the invention, a low-profile design is provided that increases the availability of the tool for use in tight spaces. According to this embodiment, and referring to FIG. 4, the outer tube is cut/segmented, and a narrow-diameter PCB spacer 20 (for example, a tube, rod or bar) is placed between the torque spring 19 and torque setting screw 22 to house the displacement sensor/potentiometer 118. In this fashion, the potentiometer 118, display bezel 8, and PCB 21, can be positioned closer to the central axis of the tool so that the projection of the display bezel from the top of the tube can be significantly reduced thus making available for use in tight spaces.

In the preferred configuration shown in the previous disclosure, the torque wrench operates as follows:

1. Power on the electronic controller.
2. Select Angle mode using mode button
3. Using up down buttons set the target Angle in degrees
4. Change to Torque mode using mode button
5. Select unit of display (ft-lb, in-lb, N-m, Kg-cm)
6. Rotate the handle to set target torque value and digitally display the target toque value and units
7. Start applying torque on the fastener until the unit clicks that is sensed tactically (a sudden drop of resistive force) and also hearing the metal to metal click sound.
8. Keeping the unit in place, change to angle mode and target angle will be displayed
9. Rotate the wrench until the progressive LED lights go from Green to RED, real-time angle display reaches the target angle, the buzzer goes on, and the tactile sensing of vibration produced by a motor.

With this, the application of Click-to-Angle of the fastener is completed.

While the steps above describe desired torque and angle being set at the beginning, the desired angle can be set after the preset torque has been reached. Furthermore, in addition to dual (torque+angle) mode operation, the device can be used for torque only as well as for angle rotation only.

According to a further embodiment, there is provided a method and apparatus to enhance the click sound that occurs when the set torque is reached. In Step "7" of a typical torque wrenches enumerated above, the clicking mechanism provides both tactical feel (sudden drop of resistive force) and also an audible metal to metal knocking sound. However, both the tactile and audio feedback are very weak at the lower target torque settings. In a noisy environment, it is especially very poor at the rated 20% torque setting. If the operator encounter this problem, he/she may not be able to release the force immediately after click and end up in "over-torquing" the fastener resulting in not able to assemble mating parts to required specification.

Figure 5:
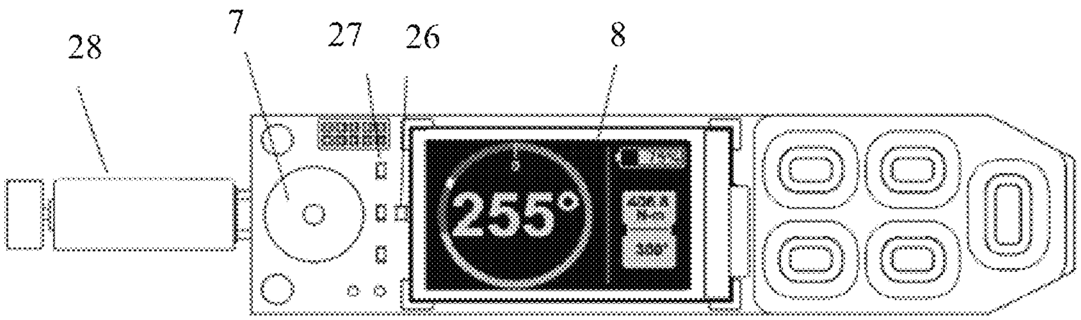
FIG. 5 is a schematic drawing showing a configuration of electronic controller hardware according to an embodiment of the invention including audio output device (e.g., buzzer) 7, display 8, inertial sensor (e.g., gyro, accelerometer) 26, LED indicator light 27 and haptic feedback device (e.g., vibration motor) 28.

In order to enhance the feedback to the user, one embodiment of the invention may use click detection hardware (see FIG. 5 for an example), including a 3-axis accelerometer, visual, audio and haptic feedback, to sense the metal-to-metal knocking sound and generate (i) a high pitch buzzer sound, (ii) vibration by switching on the miniature DC motor, and/or (iii) high intensity red LED. According to this embodiment, the user will be able to easily and reliably recognize the end of target torque application, especially in a noisy environment.

Figure 6:
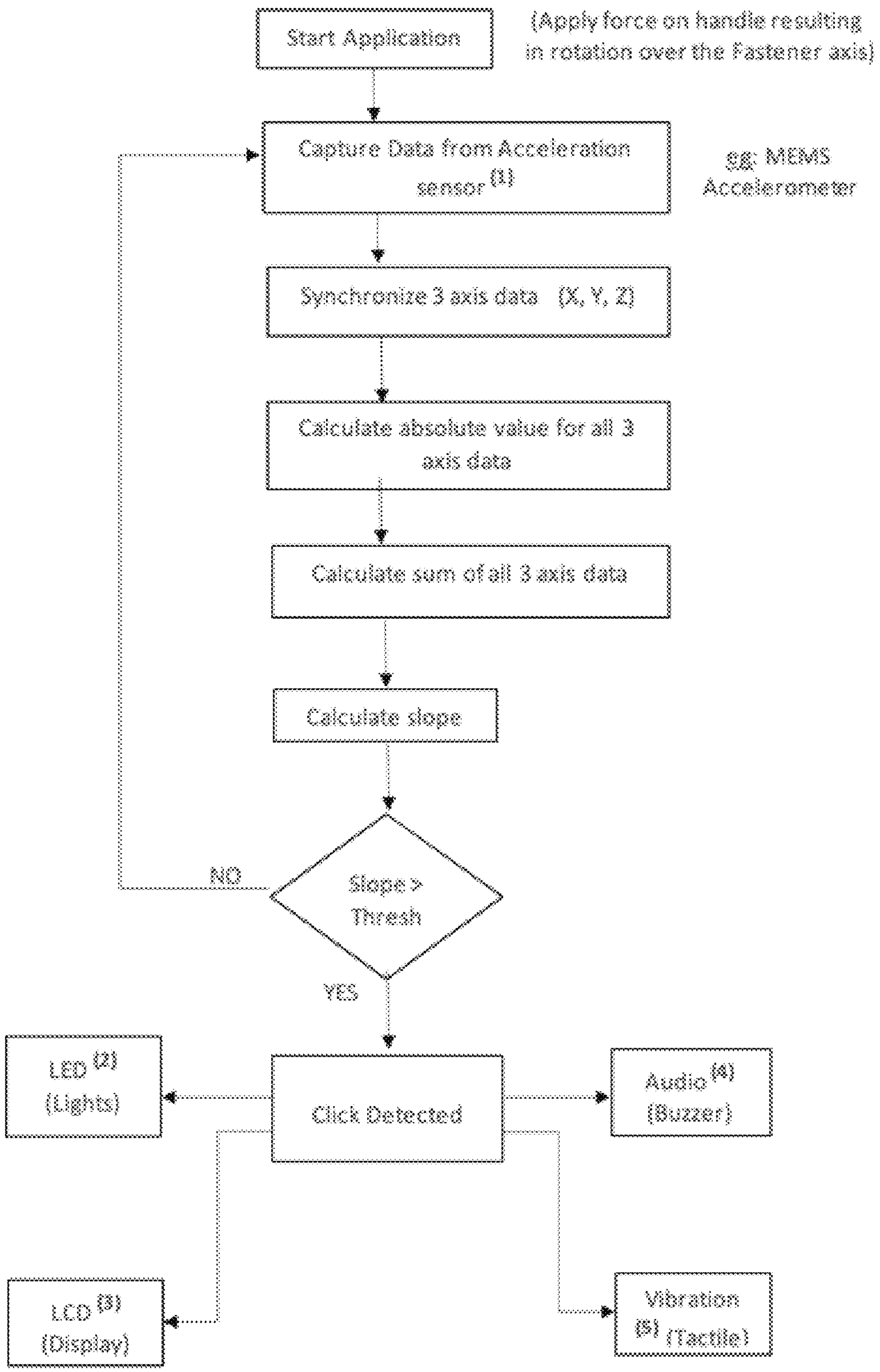
FIG. 6 is a flow chart for a click detection and alert algorithm according to an embodiment of the invention.
Figure 7:
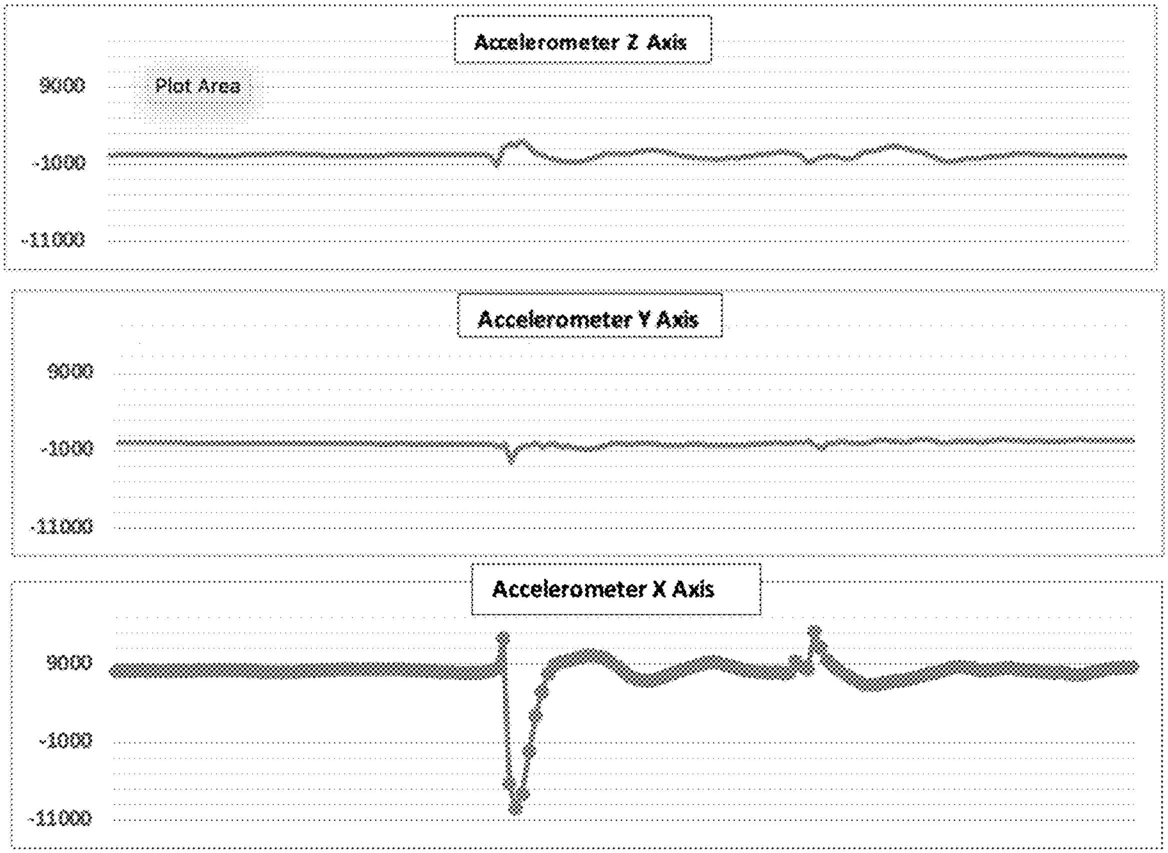
FIG. 7 shows acceleration in x, y and z axes just before, during and after the preset torque has been reached according to an embodiment of the invention. This data is analyzed to detect the exact moment "click" occurs.
Figure 8:
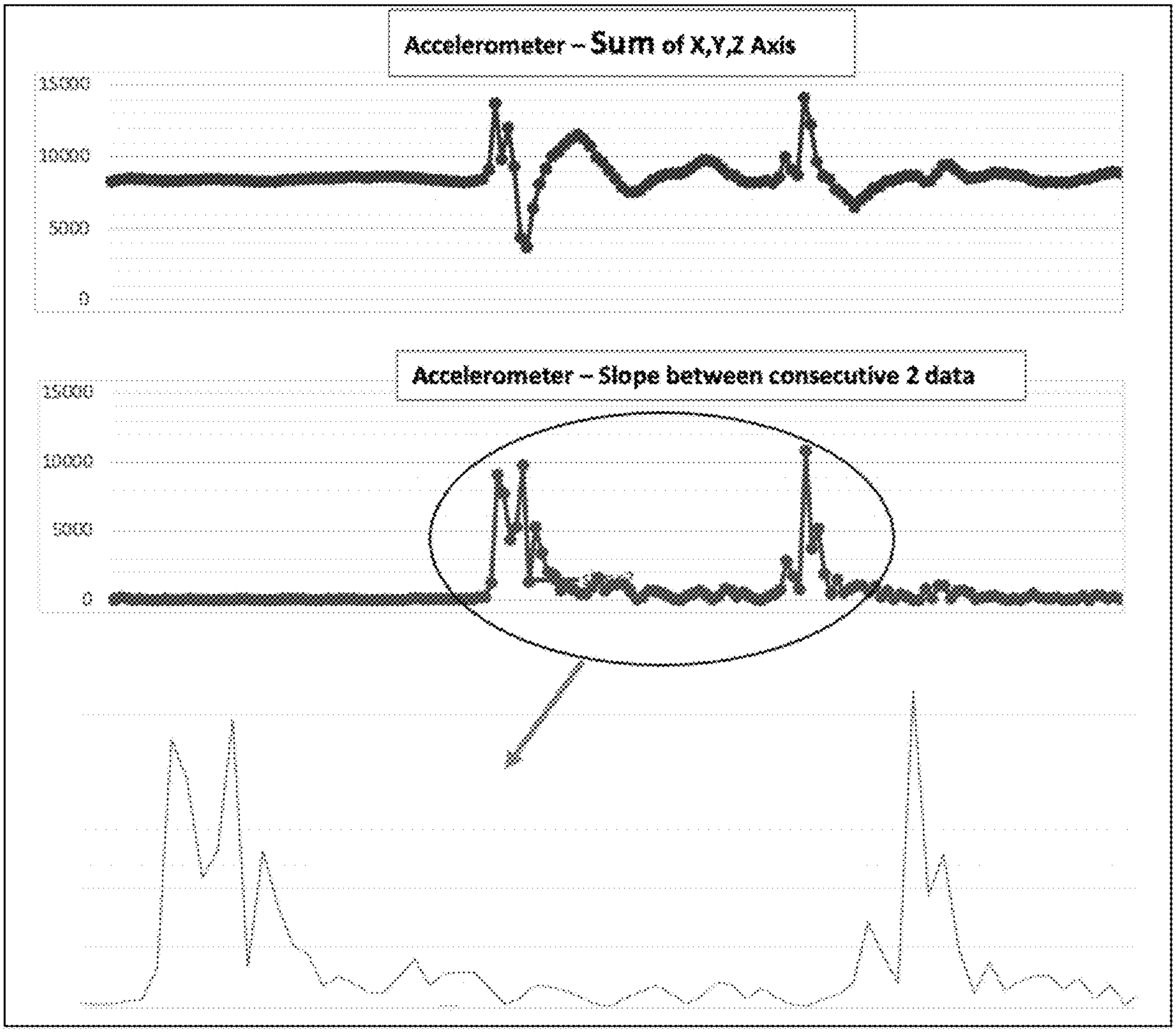
FIG. 8 shows an example of acceleration data processing that enables click detection (reaching pre-set torque) according to an embodiment of the invention. One preferred method of detection is to use summation of acceleration in x, y and z axes just before, during and after the preset torque has been reached, followed by determining when the slope over a moving window crosses a preset threshold value The time at which the threshold is reached is considered as a "click" and alert signals are output to audio, visual and haptic signal generators.

According to a further embodiment of the invention, the transition between application of desired torque and rotation to the post-torque angle of rotation may be automated, see FIG. 6. According to this embodiment, steps "1" through "9" are same as above, but Step "8" which requires the end user to manually press the mode button to enter angle mode is replaced by using data from the accelerometer as follows:

a. Data from the 3-axis MEMS accelerometer is monitored immediately once torque and post-torque angle parameters are set by the user. (See, e.g., Capture, Synchronize, Calculate axis data and Slope>Thresh steps of FIG. 6).
b. The mechanical metal-to-metal knock that occurs when the preset torque is reached (corresponding to the familiar "click") is detected and confirmed using the algorithm of FIG. 6. See also FIGS. 7 and 8.
c. Once the clicking action is detected and confirmed, the apparatus will switch over to Angle mode automatically. The screen will display the Target angle and the user now can continue with the application of angle.

The automated transition of torque to post-torque angle significantly minimizes down time and enhances productivity.

Figure 15:
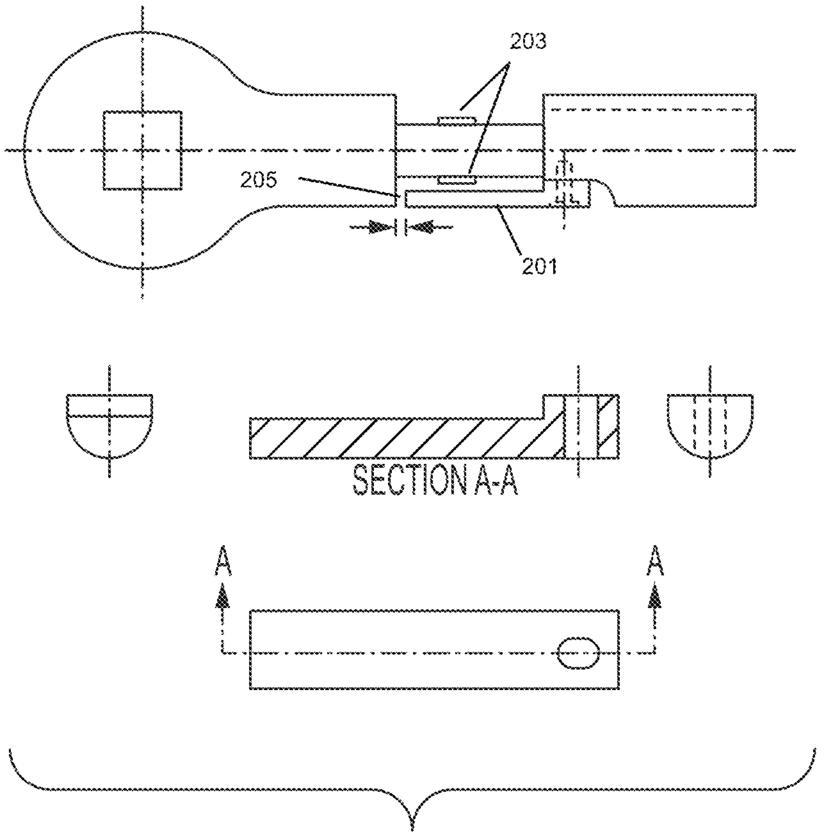
FIG. 15 is a schematic view of a torque wrench having a torque-limiting spacer to prevent damage to the device when applied torque exceeds the tool rating.

According to a further embodiment of the invention, a rated-torque limiting spacer may be provided to prevent damage to sensitive parts of the tool when the tool is used over its rated torque. Consider the case where a specific torque application is specified, for example 45 ft lb, followed by rotation of 90 degrees. Consider further that the user selects a tool for the job that is rated at 100 ft lbs. Where the selected tool is suitable for application of the initial torque of 45 ft lb, the additional rotation of 90 degrees may take the tool beyond its rated torque, thus potentially damaging sensitive parts of the tool. This embodiment, see FIG. 15, addresses that problem by providing a heat treated hardened alloy steel spacer 201 in a narrowed area of the main body 2 or of the hinge 5. One end of the spacer 201 is secured to one side of the narrowed area of the main body 2 or hinge 5 via bolt or screw. A gap 205 is provided between a free end of the spacer 201 and an opposite side of the narrowed area. During operation of the tool within its rating, the gap remains open. However, when the rated torque is exceeded, the tool will begin to bend, closing the gap and causing the free end of the spacer to contact the edge of the body or hinge that it faces. The force of any additional torque applied is borne by the hardened torque-limiting spacer, rather than by the main body or hinge. Stain gauges 205 may be provided to measure compression and tension on the narrowed area to confirm rated torque is not exceeded.

The innovations described herein are equally applicable to split beam torque wrenches which also generate a metal to metal knock (click) similar to typical mechanical Clicker torque wrenches. The main advantage of Split Beam over Mechanical Clickers is that they do not use springs that require (for optimal and accurate long term use) time consuming loading and unloading after each use. Therefore the Split Beam wrenches are preferred in applications where the time required for loading and unloading of the spring of Clicker type wrenches is not acceptable. However, a typical Split Beam Torque wrench has several limitations (i) resolution of scale is coarse, (ii) the minimum increments of torque values on the scale is coarse (10 ft-lb) per division, (iii) lack high viz display of scale, (iv) inability to set target torque accurately, (v) can only be used in either clockwise or counterclockwise only, and (vi) inability to use in a situation where the tightening specification calls for torque followed by angle of rotation.

Figure 9A:
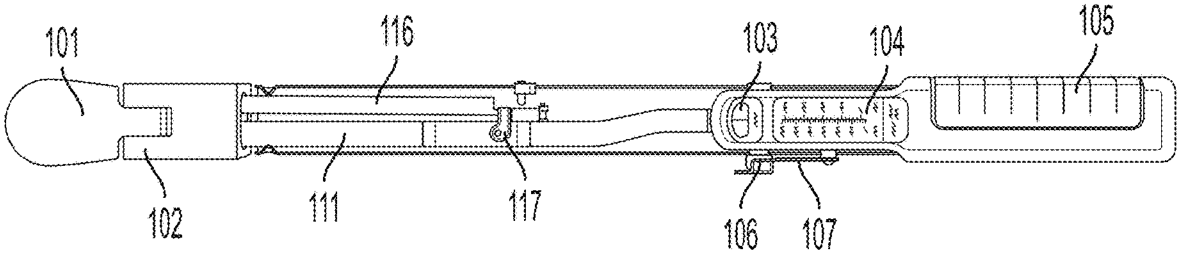
FIG. 9A is a perspective view of a typical split beam torque wrench.
Figure 9B:
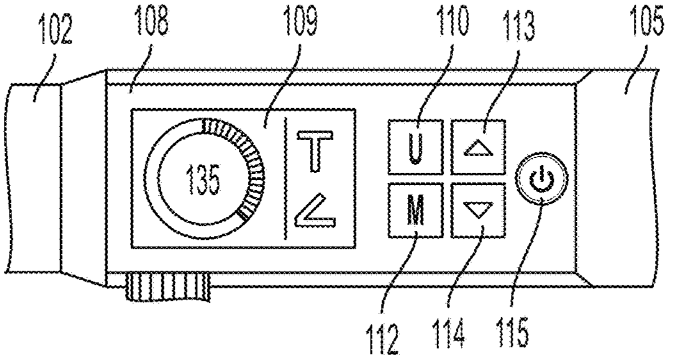
FIG. 9B is a closeup view of a split beam torque wrench which includes electronic torque and angle setting and detection according to an embodiment of the invention.

Referring to FIG. 9A, a split beam torque wrench according to the invention has a pivoting head, a wrench body including a main beam, an anchor beam and a releasable catch between the main beam and the anchor beam, a handle, printed or stamped torque indicator markings, printed or stamped torque scale, rotary torque setting knob, knob enclosure. According to an embodiment of the invention, the printed or stamped torque indicator markings and torque scale may be replaced or supplemented by electronic controller housing, TFT display dynamic color (showing a preset angle of 135 degrees), unit key, mode key, scroll up key, scroll down key and power button. The setting of torque is sensed by using a rotary sensor (for example a rotary potentiometer) and displayed on the display. This method overcomes the (i) poor resolution, (ii) coarse increments, (iii) lack of high viz display, and (iv) inability to set target torque accurately.

According to a further embodiment, the split beam torque wrench may be provided with an angle sensor and microcontroller for receiving angle-of-rotation data, computing when a preset angle of rotation has been reached, and alerting the user when the preset angle or rotation has been achieved.

Figure 10:
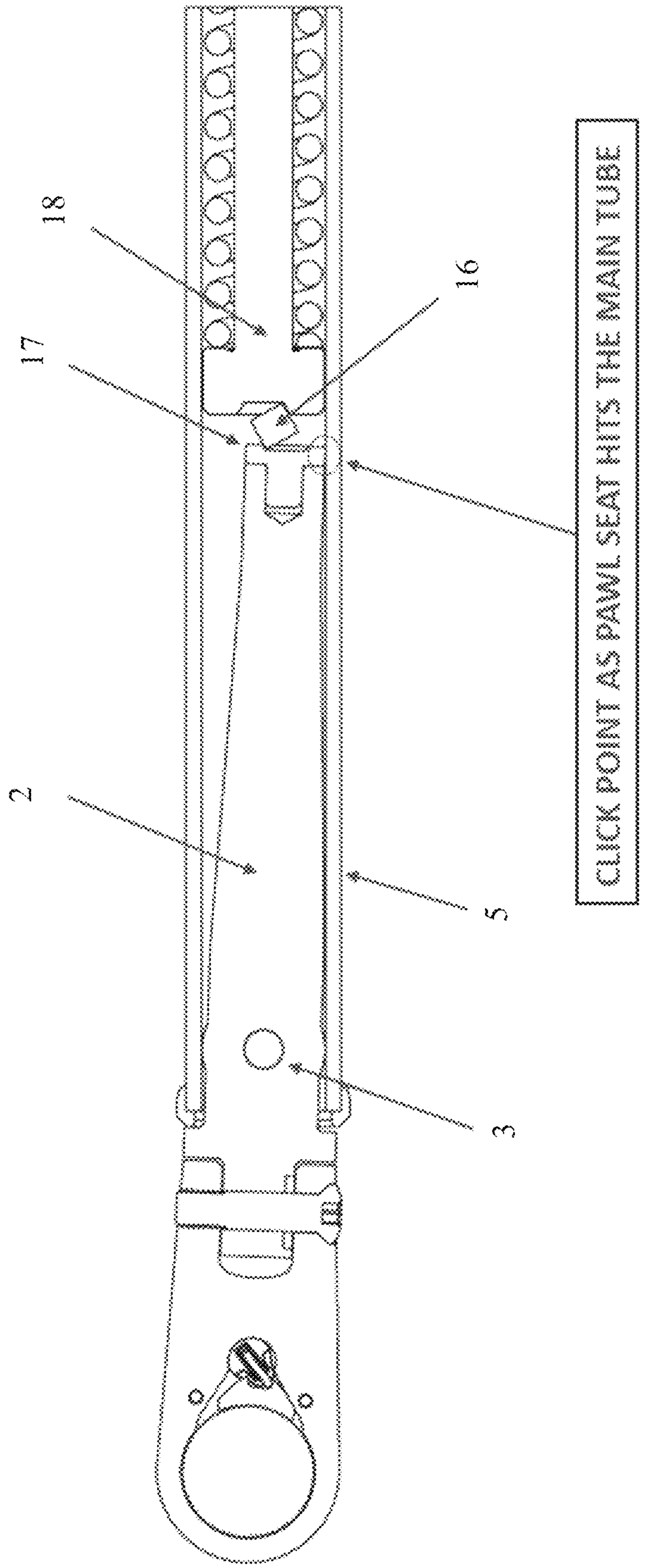
FIG. 10 is a partial cutaway view of a prior art click wrench showing how the pawl seat hits the main tube at the click point.
Figure 11:
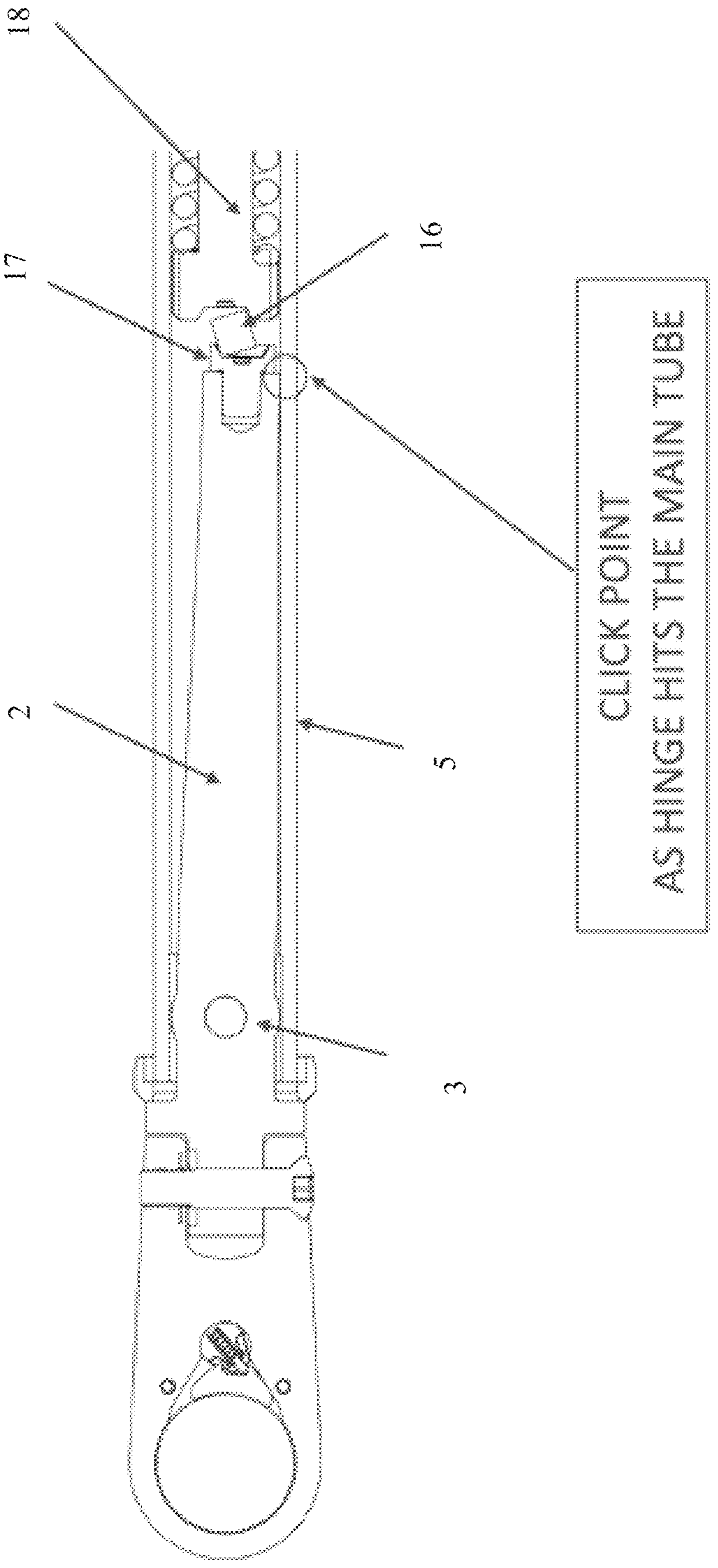
FIG. 11 is a partial cross sectional view of an embodiment of the invention in which the pawl seat is recessed behind the hinge in order to protect alignment of the pawl seat with the cam.

According to yet another embodiment of the invention, there is provided a torque wrench with improved accuracy and longevity. Prior art clicker-type torque wrenches include a ratchet head with a long tail body ending with a slot to accommodate a tiltable pawl. The tiltable pawl is sandwiched between this and another pocket of the Cam. See FIG. 10. In typical clicker torque wrenches, the pawl seat is press-fitted to the hinge and hits the tube when the unit reaches target torque and clicks. With the pawl seat mounted at the tip of the hinge in this fashion, the pawl seat is impacted each time the device clicks. Over repeated use, this can result in microcracks at the interface of the press-fit and loss of alignment with the cam. The misalignment can lead to premature loss of accuracy. Referring to FIG. 11, there is further provided according to an embodiment of the invention, a modified configuration for the pawl seat that protects the pawl seat from hitting the tube every time the wrench clicks. As shown in FIG. 11, the pawl seat is recessed into the end of the hinge (and has a narrower profile than the end of the hinge) and therefore, every time the wrench clicks (when the target torque is reached) only the hinge end will hit the inside of the main tube. Since the pawl seat does not have to absorb impact load with to this arrangement, this embodiment therefore serves to maintain accuracy of the tool over a longer period of time.

According to yet another embodiment of the invention, there is presented a torque wrench design with significantly improved handle rotation for the setting of desired torque and for unloading the spring after use. Typical mechanical clicker torque wrench require the user to unlock the handle by either pulling, pushing, or rotating a lock collar and then rotating the handle until the target torque number is aligned with tip of the handle. It often requires a substantial amount of effort to rotate the handle, especially if the value of the target torque is equal to the maximum torque rating. Furthermore, this is exacerbated due to the requirement (for tool accuracy and longevity) that the torque wrench be winded down to the bottom of the scale after use for storage if the unit is not going to be re-used immediately.

Figure 12:
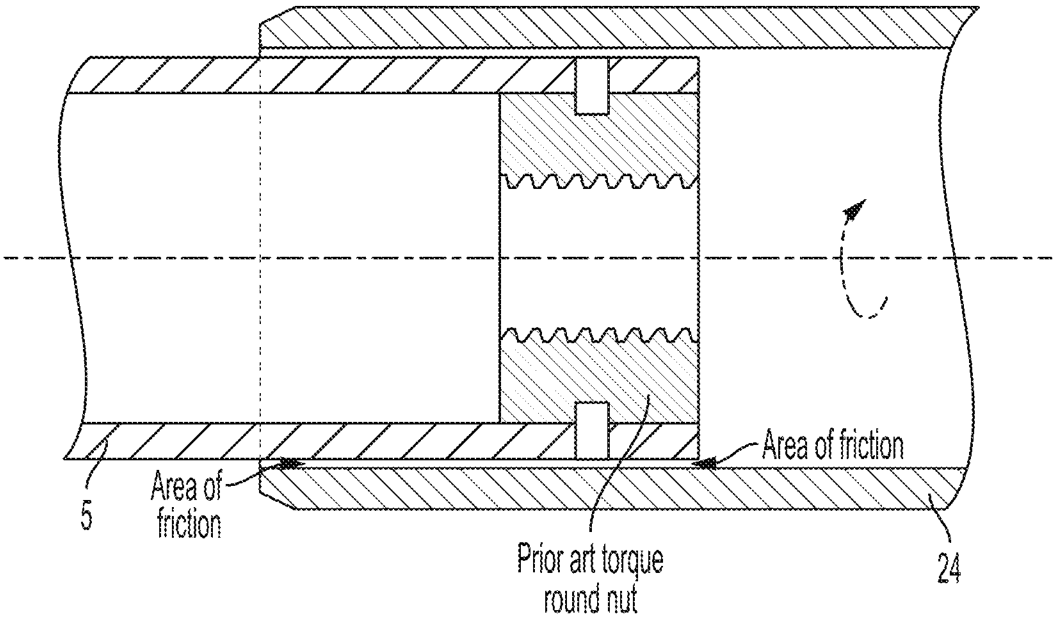
FIG. 12 is a partial cross-sectional view of a prior art mechanical torque wrench in which the main tube and the rotary scale tube share a length of frictional engagement.
Figure 13:
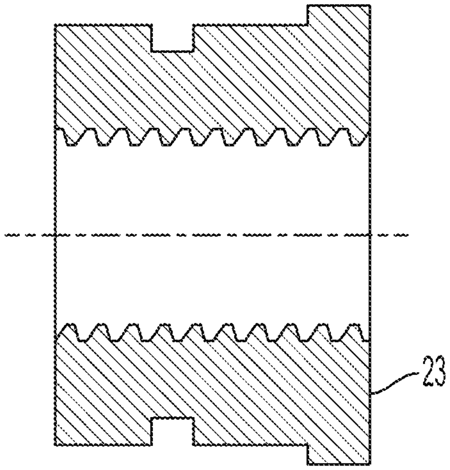
FIG. 13 shows an improved nut according to an embodiment of the invention having a shoulder portion of the torque setting nut with shoulder contacting the main tube.
Figure 14:
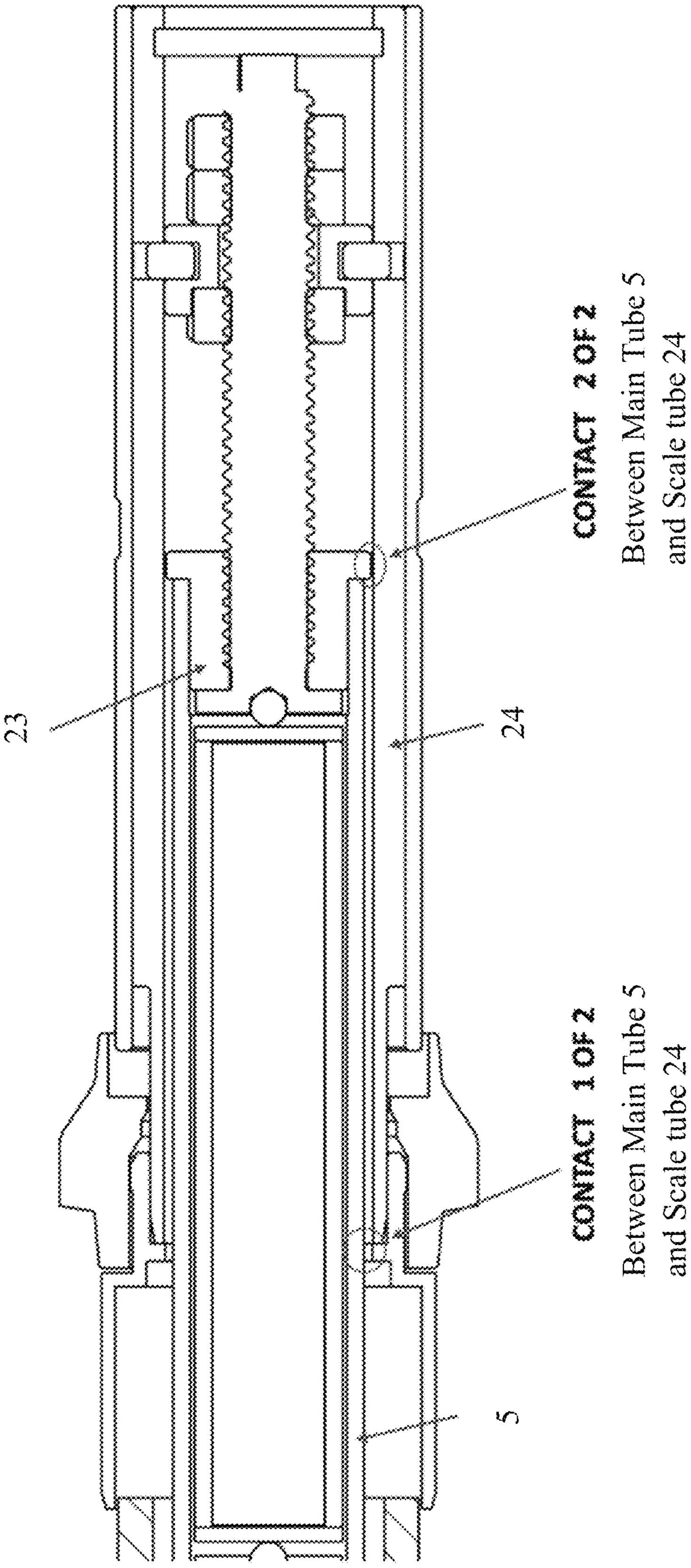
FIG. 14 is a partial cross sectional view of a torque wrench having a torque setting nut with shoulder and showing the two points of contact between the main tube and scale tube according to an embodiment of the invention.

One contributing factor for the effort required to rotate the handle to set the desired torque or to unwind the tool after use is the friction between the scale tube and the main tube, represented in FIG. 12. According to this further embodiment of the present invention, there is presented a modified design for the torque setting nut including a widened shoulder area (see FIG. 13) having an outer diameter sized so that it contacts the inside surface of the rotary scale tube as the rotary scale tube is rotated about the main tube. According to this configuration, the torque setting nut 23 will present a localized second point of contact between the Main tube and Scale tube resulting in only two localized points of contact between the Main tube and Scale tube (see FIG. 14), thereby eliminating contact throughout the overlapping lengths of Main tube and Scale tube characterized by the prior art. This improvement significantly reduces the effort required to set the target torque on repeated use by reducing the friction.

It will be appreciated by those skilled in the art that changes could be made to the preferred embodiments described above without departing from the inventive concept thereof. It is understood, therefore, that this invention is not limited to the particular embodiments disclosed, but it is intended to cover modifications within the spirit and scope of the present invention as outlined in the present disclosure and defined according to the broadest reasonable reading of the claims that follow, read in light of the present specification.

The invention claimed is:

1. A torque wrench for engaging a workpiece, comprising:

a main tube defining an elongated interior compartment;

a wrench head including a workpiece engaging portion and a bar extending therefrom, said wrench head being pivotally secured to a first end of said main tube at a pivot joint, said bar extending into said interior compartment and said workpiece engaging portion extending outwardly from said main tube;

a hand grip located on a second end of said main tube;

one of said main tube and said bar defining a narrowed portion, and a hardened spacer fixedly attached to a first end of said narrowed portion and extending substantially across said narrowed portion to define a gap between a second end of said narrowed portion and a terminal face of said hardened spacer, wherein a length of said gap is configured so that when a rated torque of said torque wrench is exceeded, bending of said torque wrench causes said gap to close and said hardened spacer to bear a force of additional torque.

* * * * *